(12) United States Patent
Gaessler et al.

(10) Patent No.: US 6,807,956 B2
(45) Date of Patent: Oct. 26, 2004

(54) METHOD FOR A CYLINDER-CHARGE CONTROL IN THE CASE OF AN INTERNAL COMBUSTION ENGINE

(75) Inventors: Hermann Gaessler, Vaihingen (DE); Udo Diehl, Stuttgart (DE); Karsten Mischker, Loenberg (DE); Rainer Walter, Pleidelsheim (DE); Bernd Rosenau, Tamm (DE); Juergen Schiemann, Markgroeningen (DE); Christian Grosse, Kornwestheim (DE); Volker Beuche, Stuttgart (DE); Stefan Reimer, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/257,191

(22) PCT Filed: Mar. 15, 2001

(86) PCT No.: PCT/DE01/00989
§ 371 (c)(1),
(2), (4) Date: Feb. 28, 2003

(87) PCT Pub. No.: WO01/79675
PCT Pub. Date: Oct. 25, 2001

(65) Prior Publication Data
US 2003/0154964 A1 Aug. 21, 2003

(30) Foreign Application Priority Data
Apr. 13, 2000 (DE) .......................................... 100 18 303

(51) Int. Cl.$^7$ ............................ F02M 25/07; F01L 1/34
(52) U.S. Cl. .............................. 123/568.14; 123/90.16; 123/90.11
(58) Field of Search ................................ 123/58.8, 347, 123/348, 90.11, 90.12, 90.14, 90.15, 90.16, 90.17, 90.18, 568.11, 568.14, 568.21, 316

(56) References Cited

U.S. PATENT DOCUMENTS

| 2,344,993 | A | * | 3/1944 | Lysholm .................... 123/316 |
| 4,192,265 | A | * | 3/1980 | Amano et al. ............ 123/316 |
| 4,442,809 | A | * | 4/1984 | Nohira et al. ............ 123/316 |
| 4,700,684 | A | * | 10/1987 | Pischinger et al. .... 123/568.14 |
| 5,123,397 | A | * | 6/1992 | Richeson ............... 123/568.14 |
| 5,367,990 | A | | 11/1994 | Schechter |
| 5,862,790 | A | * | 1/1999 | Dai et al. .................. 123/316 |
| 6,360,701 | B1 | * | 3/2002 | Ruch ..................... 123/568.14 |
| 6,626,164 | B2 | * | 9/2003 | Hitomi et al. ......... 123/568.14 |

FOREIGN PATENT DOCUMENTS

| DE | 43 08 931 | 9/1994 |
| EP | 0 397 359 | 11/1990 |

(List continued on next page.)

OTHER PUBLICATIONS

Goebel: "Gemischbildung Bei Drosselfreier 1 Aststeuerung Von Ottomotoren" Motortechnische Zeitschrift vol. 54, No. 12, Dec. 1, 1993, pp. 616–622.

(List continued on next page.)

Primary Examiner—Willis R. Wolfe, Jr.
(74) Attorney, Agent, or Firm—Kenyon & Kenyon

(57) ABSTRACT

A method for cylinder-charge control is described as implementing an internal recirculation of residual gas in the cylinder, through controlling the closing times of at least one exhaust valve of the respective cylinder and by opening at least one intake valve in the vicinity of top dead center of the piston, along with intermittent discharge of residual gas in front of the at least one intake valve. Within one charge-exchange process in the cylinder, in at least two phases that are offset in time from one another, at least one intake valve is opened. This method optimizes the engine operation in the warm-up phase from the standpoint of consumption, pollutant emission and running smoothness.

7 Claims, 1 Drawing Sheet

FOREIGN PATENT DOCUMENTS

| | | |
|---|---|---|
| EP | 0 473 258 | 3/1992 |
| EP | 0 594 463 | 4/1994 |
| JP | 087768 | 3/2000 |

OTHER PUBLICATIONS

M. Pischinger, J. Hagen, W. Salber, T. Esch: Moeglichkeiten der ottomotorischen Prozessfuehrung bei Verwendung des elektromechanischen Ventiltriebs, 7. Aachener Kolloguium Fahzeung–und Motorentechnik, 1998 p. 987–1015.

MTZ Motortechnische Zeitschrift 60 (1999) 7/80 pp. 476–485.

* cited by examiner

METHOD FOR A CYLINDER-CHARGE CONTROL IN THE CASE OF AN INTERNAL COMBUSTION ENGINE

FIELD OF THE INVENTION

The present invention relates to a method for controlling the cylinder charge in an internal combustion engine having variable timing of the gas-exchange valve of its cylinders. An internal recirculation of the residual gas in the cylinder is implemented by controlling the closing times of the at least one exhaust valve of the respective cylinder and by opening the at least one intake valve near top dead center, including the intermittent discharge of residual exhaust gas in front of the at least one intake valve.

BACKGROUND INFORMATION

Appropriate methods for exhaust control may include the early closing of all exhaust valves of a cylinder before the piston in the cylinder has reached its top dead center or the delayed closing of at least one exhaust valve of a cylinder only after at least one intake valve of the cylinder has opened. In the second case, a so-called valve overlap, a pressure drop from the exhaust side to the intake side is used for the internal recirculation of residual gas. This drop may be caused or intensified by the use of a throttle valve in the intake manifold.

In MTZ Motortechnische Zeitschrift 60 (1999) 7/80, pages 476–485, a choke-free load control including fully-variable valve gears for a spark-ignition engine is described. In engines having variable valve timing, the charge, or power output, is controlled, fully or in part, by controlling the opening curve of the gas-exchange valves (intake and exhaust valves of the cylinders). A throttle valve in the intake manifold may be present in addition, but may also be dispensed with entirely.

To be considered as variables of the opening curve of a valve, i.e., as parameters that may be adjusted by valve timing, are the following:
1. Beginning and end of the valve opening. This is also referred to as operating points for the valve opening. Generally, the operating points may be characterized by the crankshaft's angular position relative to a, e.g., cylinder-specific, reference position. An important factor in this context may be the phase relation to the working cycle of the respective cylinder, such as the position during the compression cycle, expansion stroke, discharge stroke or intake stroke.
2. Valve lift.
3. The average or maximum velocity of the valve at opening or closing. This is also referred to as curve steepness of the valve lift curve.

In an engine having fully variable valve gears, as is described in the MTZ 60 (1999) 7/8, pages 479–485, the gas-exchange valves may be controlled directly and actuated by electromagnetic or electro-hydraulic valve actuators, for example. In particular, the cylinder charge may be metered solely through the appropriate controlling of the valves, the use of a throttle valve not being required. By reducing throttling losses, i.e., the pumping action of the engine, the engine efficiency may be increased and the specific consumption may thereby be reduced. Engines dethrottled in this manner may present a problem in that the conditions for the external mixture formation in the intake manifold may be more difficult. In engines controlled by throttle valves, a vacuum pressure may exist in the intake manifold, except in the case of a full load, which may allow a desirable vaporization of the fuel normally injected in the vicinity of the intake valves. In the case of a dethrottled engine, however, ambient pressure practically prevails in the intake manifold, causing a marked reduction in the vaporization rate and a corresponding increase in the fluid fuel portion (wall film). This may have a serious effect when the engine is cold, i.e., at cold start and during the subsequent warm-up phase. For instance, the control strategy of "early intake— closing" which may be desirable in partial load operation when the engine is warm (cf. MTZ 60 (1999) 7/8) may turn out to be undesirable in a cold engine since fuel, partly in liquid form, may be drawn into the combustion chamber and not sufficiently processed, i.e., vaporized and homogenized together with the air, by the time ignition occurs. Moreover, by the early closing of the intake valves and due to the cooling of the cylinder charge during the subsequent expansion, fuel that has already evaporated may condense in the vicinity of bottom dead center of the piston. Under such conditions, the combustion quality, running smoothness, fuel consumption and the pollutant concentration in the exhaust gas may be correspondingly poor. In such timing of the intake valves, which is intended to reduce throttle losses to the greatest possible extent, these are opened near the piston's top dead center and, given a partial load, are closed early, i.e., before bottom dead center.

With respect to the control strategy used for the gas-exchange valves, the following two conventional measures may improve the mixture formation and carburetion in a choke-free spark-ignition engine:
1. An intake-guided exhaust-gas recirculation, where residual gas is discharged via the intake valves and reaspirated. This internal recirculation of residual gas is described, for instance, in M. Pischinger, J. Hagen, W. Salber, T. Esch: Möglichkeiten der ottomotorischen Prozessführung bei Verwendung des elektromechanischen Ventiltriebs, 7. Aachener Kolloquium Fahrzeug—und Motorentechnik, 1998, p. 987–1015.
2. Delayed opening of the intake valves, as it is described from the previously cited publication.

The two mentioned conventional methods may have the effect of lowering the pollutant concentration of the raw exhaust gases during warm-up of the engine. Furthermore, the method of internal recirculation of residual gas also may have this effect in engines at operating temperature. It may be important to reduce the pollutant concentration of the raw exhaust gas during the warm-up phase, such as, for example, in the early phase of warm-up during which the light-off temperature of the catalytic converter has not yet been reached and the catalytic converter may thus be only able to filter or convert the pollutants to a very limited degree.

By the strategy of a delayed opening of the intake valves, a vacuum pressure may be generated in the cylinder after the charge-change process, due to the expansion of the cylinder volume in top dead center. Intake valves are opened only once the pressure in the cylinder is sufficiently low, or once a supercritical pressure relationship between cylinder and intake manifold (<approx. 0.5) has been reached. This may result in a high inflow velocity (maximally sonic velocity) of the fresh gas into the respective cylinder. This highly dynamic, turbulent inflow-process may improve the mixture carburetion, namely due to the feature that liquid fuel portions are better atomized and are subsequently nearly completely evaporated. Moreover, the homogenization of the gas components air, fuel vapor and residual gas may be improved. In this manner, an improvement in the pollutant concentrations in the raw exhaust gas may be achieved, such as, for example, of unburned hydrocarbons (HC). Moreover, the improved combustion—apart from the achieved carburetion, the increased turbulence of the cylinder charge may also exert a positive influence here—may be able to mostly compensate for the increased charge-change losses of this method, such as in the case of a cold engine.

The other mentioned strategy may cause an increase in the portion of hot residual gas contained in the cylinder charge, for instance by closing the exhaust valves ahead of top dead center and the early opening of at least one intake valve, also before or near top dead center, optionally also by using a cylinder overlap. In addition, the pressure drop existing between cylinder and intake channel (intake manifold) in the vicinity of top dead center, given an already open inlet, may cause part of this hot exhaust gas to stream into the intake manifold. This residual gas, discharged in the vicinity of the fuel injector and fuel wall film, may cause a quick warming of the intake elbow after a cold start and may improve the mixture formation, i.e., the vaporization of liquid portions of the fuel in the intake manifold. While the intake valve remains open, the mixture of residual gas and fresh gas is then directly drawn into the cylinder. Due to an increased charge temperature, the further mixture carburetion in the cylinder may also be improved. This method of internal recirculation of residual gas may bring about a reduction in the fuel consumption as well as in the pollutant concentration of the raw exhaust gas (such as, for example, hydrocarbons). Moreover, the combustion temperature may be lowered due to charge dilution by residual gas, which in turn may significantly lower the pollutant concentration (NOx components) of the raw exhaust gas. Furthermore, a further decrease in the pumping work may improve the fuel consumption. On the other hand, a higher residual gas portion may also have a negative effect on the homogenization of the cylinder charge—in particular with respect to the components fresh gas and residual gas. Also, the combustion rate may go down and the inflammation phase may be lengthened when the residual-gas concentration rises. This may cause more cyclical combustion fluctuations, detrimentally affecting smooth running and combustion efficiency.

SUMMARY OF THE INVENTION

The present invention relates to a method that may ensure a desirable engine operation based on fuel consumption, pollutant emission and smooth running, in particular during the warm-up phase.

This may be achieved in that at least one intake valve is opened in the cylinder within a charge cycle, in at least two phases that are offset in time from one another. Moreover, an internal recirculation of the residual gas via the intake channel may be implemented by an appropriate control of the at least one exhaust valve and the at least one intake valve.

In addition to reducing the NOx concentration in the untreated exhaust gas, the controlling of the gas-exchange valves according to the present invention may achieve more efficient combustion and smoother running. The example method according to the present invention, due to a highly dynamic intake process following the second delayed opening of at least one intake valve and the resulting increased charge movement in the combustion chamber, may decrease or avoid the undesirable features for combustion stability and engine smoothness that are attributable to high portions of recirculated residual gas which, in the conventional methods of exhaust-gas recirculation, may be caused by a poor mixing of fresh gas and residual gas in the cylinder and a markedly slower combustion and which limit the achievable recirculation rate for the exhaust gas there. The example method according to the present invention may be implemented in an engine having fully variable valve timing without additional expenditure for components.

The example method according to the present invention may not only be used in a spark-ignition engine having manifold injection (external mixture formation) but also in engines having internal mixture formation, such as spark-ignition engines with direct injection, diesel engines.

Accordingly, at least one intake valve is opened, for example, in two phases that are offset in time from one another, the first phase of the intake-valve opening beginning in the vicinity of top dead center and the second phase of the intake-valve opening beginning after top dead center. The exhaust valves may be closed prior to the start of the first phase of the intake-valve opening or, if a valve overlap is used, may be closed prior to the end of the first phase of the intake-valve opening.

The beginning of the second phase of the intake-valve opening following the conclusion of the first phase may be selected such that a vacuum pressure builds in the cylinder to such a degree that a desired inflow velocity for the gas mixture into the cylinder may be achieved.

In the case of a 6-stroke or an 8-stroke engine operation, the second phase of the intake-valve opening may be offset by at least approximately one crankshaft rotation after the first phase of the intake-valve opening. This means that the residual gas quantity, which is recirculated after discharge of the residual gas into the area in front of the intake valves, remains in the intake manifold during the at least one piston rotation. In this case, the charge-cycle phase extends over more than two strokes, the at least two intake-valve opening phases that are offset in time from one another being separated by a particularly long period of time.

All intake and exhaust valves may be individually controllable with respect to lift, flank steepness, opening curve and opening times.

Furthermore, the beginning and the end of the opening phases and/or the lifts and/or the flank steepness of the opening curves for the intake and exhaust valves may be selected such that the respective desired quantities of fresh gas and residual gas are present in the cylinder after the charge-exchange process has been completed and that the inner flow of the combustion chamber as well as the turbulence of the cylinder charge are present in a desired form and intensity.

Moreover, the beginning and the end of the opening phases and/or the lifts and/or the flank steepness of the opening curves for the intake and exhaust valves may be controlled, based on the criteria of optimal mixture formation and exhaust-gas quality, the lowest possible energy input for the valve actuation and for the discharge and renewed aspiration of residual gas, as well as the lowest possible fuel consumption.

DETAILED DESCRIPTION

Figure 1:
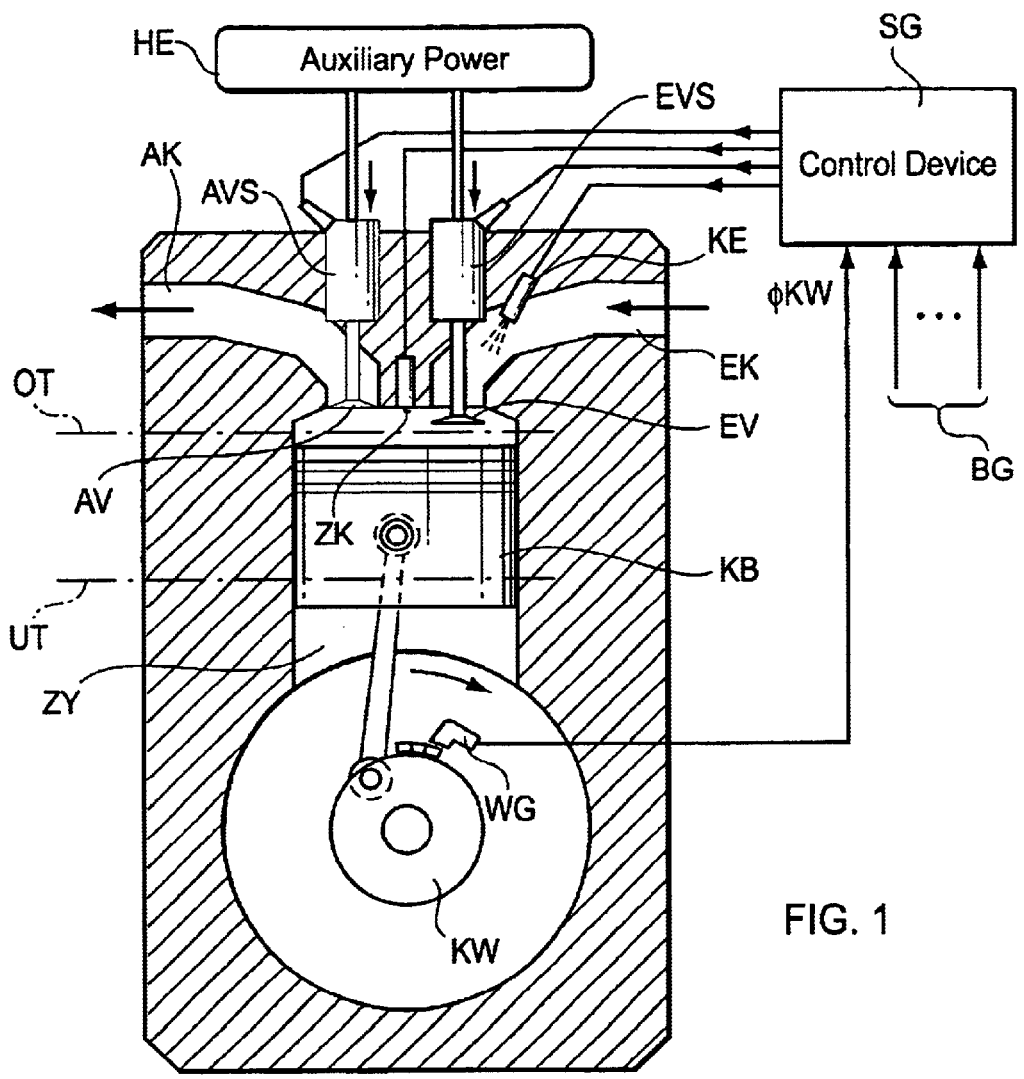
FIG. 1 shows a cross-section through a cylinder of a spark-ignition engine having variable valve control.

FIG. 1 shows a cross-section through a cylinder ZY of a spark-ignition engine. A piston KB moves in cylinder ZY in 4-stroke operation, for example, using the conventional working cycle consisting of intake stroke, compression stroke, working stroke and expulsion stroke. Also shown in the drawing is a crankshaft Kw which is set into rotation by the piston's up-and-down movement. The uppermost position that piston KB is able to reach in its lift movement, is referred to as top dead center and indicated in FIG. 1 by a dashed line OT. The lowest position of the piston lift is bottom dead center and indicated by a dashed line UT. At the head of cylinder ZK are an intake channel EK and an outlet channel AK. A spark plug ZK which ignites the fuel-air mixture in the cylinder is inserted in cylinder ZY. Fuel injector KE injects the fuel into intake channel EK.

Intake channel EK is able to be opened or closed toward cylinder ZY by one or a plurality of intake valves EV. One or a plurality of exhaust valves AV which open or close outlet channel AK toward cylinder ZY are also provided. The sketch in FIG. 1 shows only one intake valve EV and one exhaust valve AV. However, conventional engines usually have a plurality of intake and exhaust valves. For the sake of simplicity, reference is made to only one intake valve EV and one exhaust valve AV.

The spark-ignition engine described here includes fully variable valve timing. For that reason, intake valves EV and exhaust valves AV in each case have engine-valve actuators EVS and AVS. An auxiliary power HE is provided for engine-valve actuators EVS and AVS, for instance, an electric current or an electric voltage, if electro-magnetic engine-valve actuators EVS, AVS are involved. The auxiliary power may also be hydraulic or pneumatic energy, for example, if engine-valve actuators EVS, AVS operate according to hydraulic or pneumatic principles.

A control device SG including a microprocessor, program memory, data memory, etc., in a conventional manner, supplies control signals for spark plug ZK, fuel injector KE and engine-valve actuators EVS, AVS of intake valve EV and exhaust valve AV. Crank angle φKW, which is detected by a sensor WG for the crankshaft position, is one of the input variables of control device SG. Generally, control device SG includes additional operating variables BG of the engine, which influence the regulating of fuel injection, ignition and the actuation of intake valve EV and exhaust valve AV. Taken into consideration as operating variables BG are, for instance, the engine speed, driver input, engine temperature, ambient pressure, aspirated air mass and others.

The controlled variables for the gas-exchange valves (intake valve EV, exhaust valve AV) are continually determined in control device SG—for instance, synchronously with the crankshaft or specific to the working cycle of the engine—and converted into corresponding control signals for engine-valve actuators EVS and AVS. These signals cause intake valve EV and exhaust valve AV to implement a desired valve-lift curve. The valve-lift curve is characterized by the times of the opening and closing, the lift and the flank steepness as well.

Figure 2:
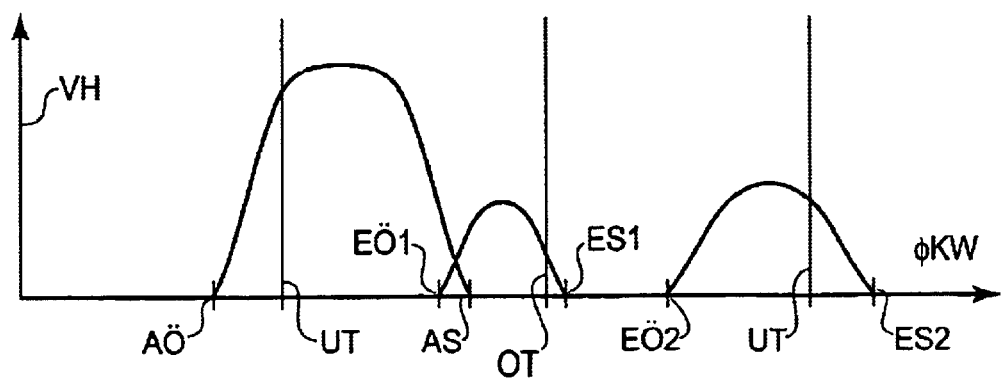
FIG. 2 shows valve-lift curves of the intake and exhaust valves of the engine.

In order to achieve the afore-mentioned features of reduced NOx concentration of the untreated exhaust gas, improved combustion and running smoothness, such as, for example, in the warm-up phase of the engine, control device SG controls intake valve EV and exhaust valve AV in such a manner that the valve curves VH result, for example, as a function of crankshaft angle φKW, as represented in FIG. 2.

In the exemplary embodiment shown in FIG. 2, the opening time AÖ for exhaust valve AV is before bottom dead center UT, and its closing time AS is before top dead center OT. Intake valve EV opens in a first phase shortly before exhaust valve AV closes. Opening time EÖ1 of intake valve EV in the first opening phase thus comes before closing time AS of exhaust valve AV. Shortly after piston KB has left top dead center OT, intake valve EV is closed again in the first opening phase. Closing time ES1, therefore, comes after top dead center OT. Alternatively, closing time AS of exhaust valve AV may also come before opening time EÖ1 of the first opening phase of intake valve EV. When a large lift overlap is used for the purpose of internal recirculation of residual gas, it is also possible to select a closing time AS that occurs significantly later. The position of the two described valve-lift curves for exhaust valve AV and intake valve EV cause an internal recirculation of residual gas into intake channel EK. In this context, the pressure drop present between cylinder and intake channel in the vicinity of top dead center, given an already open intake valve EV, causes part of this hot exhaust gas to stream into intake channel EK. During the warm-up phase of the engine, this residual gas, which is discharged into the region of fuel injector and fuel wall film in the intake channel, heats up the initially still cold intake manifold and improves the mixture formation, that is, the liquid portion of the fuel is vaporized in the intake channel. While intake valve EV remains open, the mixture of residual gas and fresh gas is then drawn into the cylinder.

Offset with respect to closing time ES1 in the first opening phase of intake valve EV, a second opening phase occurs for intake valve EV, beginning with the opening time EÖ2. Closing time ES2 in the second opening phase comes after bottom dead center UT. In the period between closing time ES1 of the first opening phase and the opening time EÖ2 of the second opening phase of intake valve EV, the piston movement in the direction of bottom dead center UT creates a relatively large vacuum in the cylinder with respect to the pressure in intake channel EK. If, during the second opening phase, intake valve EV is opened, the vacuum in the cylinder produces a very high inflow velocity, maximally reaching the speed of sound. Through this aspiration process, the residual gas discharged into intake channel EK, which contributes to the vaporization of the liquid fuel portions at the inner wall of intake channel EK, reaches cylinder ZY together with fresh gas. Due to the higher charge temperature and turbulence this creates, the further carburetion of the fuel-air mixture in the cylinder is improved. In this manner, the fuel consumption may be reduced and the pollutant concentration (especially HC) in the untreated exhaust gas lowered. Moreover, due to the charge dilution by the residual gas, the combustion temperature is lowered, which may also reduce the pollutant concentration (NOx components) of the untreated exhaust gas.

The instantaneous controlled variables, i.e., the opening and closing times, lifts and flank steepness of the valve-lift curves, are expediently specified at least as a function of the instantaneously requested engine output. However, the controlled variables may additionally be a function of other parameters as well. Such parameters may include the engine-state variables detected by sensors or otherwise determined (such as cooling-water temperature, engine-oil temperature, etc.), the time or number of engine rotations after the engine start, ambient parameters detected by sensors or by other arrangements (for instance the temperature of the aspirated air), driver reactions or specifications (such as gear selection) as well as other variables that are formed as a function of the mentioned parameters or the temporal development of these parameters.

The controlled variables for the gas-exchange valves should be selected as a function of the previously mentioned parameters in such a manner as to result in optimal engine operation, based on criteria such as fuel consumption, exhaust-gas quality, exhaust-gas temperature, running smoothness or other characteristics.

The example method described above may also be used limited to specific, well-defined conditions or operating states of the engine (for instance, in the warm-up phase until a defined threshold for the engine temperature has been reached), in all other respects use being made of a conventional method for controlling the gas-exchange valves.

What is claimed is:

1. A method of internally recirculating a residual gas for controlling a cylinder-charge within cylinders of an internal combustion engine having variable timing of gas-exchange valves, comprising:

controlling closing times of at least one exhaust valve of a respective cylinder;

opening in a first operating phase at least one intake valve of the respective cylinder in a vicinity of a top dead center;

intermittently discharging the residual gas in front of the at least one intake valve; and implementing at least one further opening phase of the at least one intake valve within a charge-exchange process to increase a charge movement in a combustion chamber, the at least one further opening phase being offset in time from the first opening phase of the at least one intake valve;

wherein the at least one intake valve is opened in two phases that are offset in time from one another, the first opening phase of the at least one intake-valve beginning in the vicinity of the top dead center and a second opening phase of the at least one intake valve beginning after the top dead center, and wherein a beginning of the second opening phase is selected to be after an end of the first opening phase such that a vacuum pressure is built up in the respective cylinder so that a desired high inflow velocity for a gas mixture into the respective cylinder comes about.

2. The method according to claim 1, wherein all exhaust valves are closed prior to a beginning of the first opening phase.

3. The method according to claim 1, wherein all exhaust valves are closed prior to an end of the first opening phase, but before the top dead center.

4. The method according to claim 1, wherein, in one of a 6-stroke and an 8-stroke engine operation, the second opening phase begins after the first opening phase at an offset of at least approximately one crankshaft rotation.

5. The method according to claim 1, wherein all intake valves and exhaust valves are individually controlled with respect to a lift, a flank steepness of an opening curve, and an opening time of the at least one intake valve and the at least one exhaust valve.

6. The method according to claim 5, further comprising:

selecting at least one of: i) a beginning and an end of the opening phases, ii) the lift, and iii) the flank steepnesses of the opening curve such that, after a conclusion of a charge-changing process in the respective cylinder, respective desired quantities of a fresh gas and the residual gas are present, and an internal flow in the combustion chamber and a turbulence of the cylinder-charge are present in a desired form and intensity.

7. The method according to claim 5, wherein at least one of: i) a beginning and an end of the opening phases, ii) the lift, and iii) the flank steepnesses of the opening curve are controlled according to a criteria of an optimal mixture formation quality and an exhaust-gas quality, a lowest possible energy input for actuating the valves and for a discharge and a re-aspiration of the residual gas, and a lowest possible fuel consumption.

* * * * *